United States Patent [19]
Gronau et al.

[11] Patent Number: 4,745,464
[45] Date of Patent: May 17, 1988

[54] BLACK-CURRENT-SETTING CIRCUIT FOR COLOR CRT

[75] Inventors: Gerald Gronau, Hildesheim; Lukas Hinkel, Nordstemmen, both of Fed. Rep. of Germany

[73] Assignee: Blaupunkt-Werke GmbH, Hildesheim, Fed. Rep. of Germany

[21] Appl. No.: 8,307

[22] Filed: Jan. 29, 1987

[30] Foreign Application Priority Data

Jan. 29, 1986 [DE] Fed. Rep. of Germany ....... 3602529

[51] Int. Cl.$^4$ .............................................. H04N 9/72
[52] U.S. Cl. ....................................... 358/34; 358/74; 358/243
[58] Field of Search ...................... 358/34, 65, 74, 168, 358/172, 243, 39

[56] References Cited
U.S. PATENT DOCUMENTS

| | | | |
|---|---|---|---|
| 4,298,886 | 11/1981 | Perkins | 358/243 |
| 4,484,228 | 11/1984 | Parker | 358/74 |
| 4,506,292 | 3/1985 | Newton et al. | 358/34 |
| 4,562,479 | 12/1985 | McDonald | 358/243 |
| 4,675,726 | 6/1987 | Leshko | 358/74 |
| 4,679,065 | 7/1987 | Umezawa | 358/74 |
| 4,680,640 | 7/1987 | Blanken et al. | 358/74 |

*Primary Examiner*—John W. Shepperd
*Attorney, Agent, or Firm*—Frishauf, Holtz, Goodman & Woodward

[57] ABSTRACT

To control the operating point of video output stages, and particularly of wide-band video output stages, a voltage corresponding to cathode beam current is applied to a standard video processor (22), for example of the type TDA 3301, which includes at least one sticking voltage or set point or cut-off automatic control circuit, preferably one for each of the respective red, green and blue chromaticity signals (1, 2, 3). The output signal from the sticking voltage or set point or cut-off automatic control circuit, in accordance with a feature of the invention, is superimposed on the video signals applied to the video output circuit. When color display apparatus or monitors are provided, three wide-band video output circuits are provided.

6 Claims, 1 Drawing Sheet

U.S. Patent
May 17, 1988
4,745,464
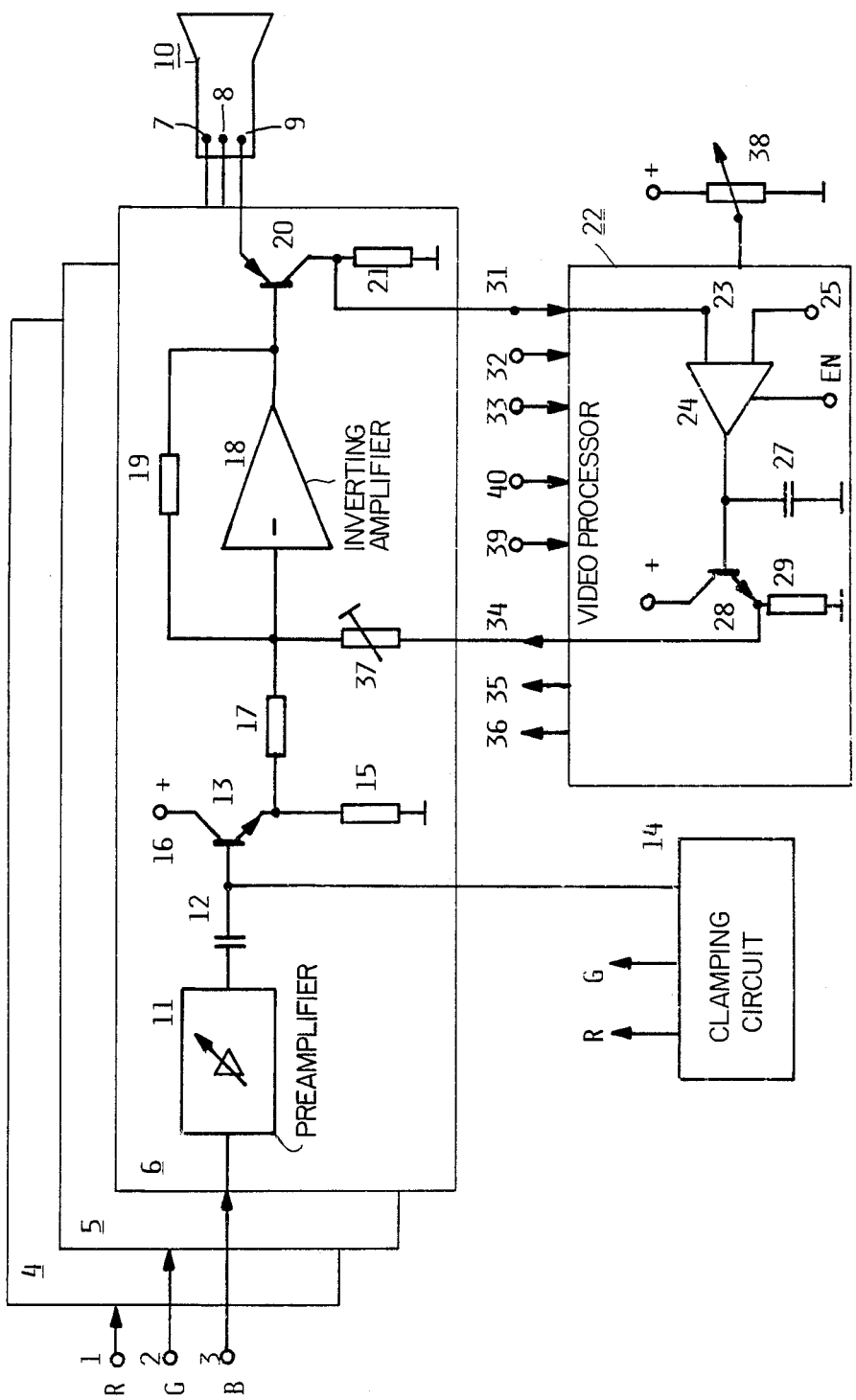

4,745,464

BLACK-CURRENT-SETTING CIRCUIT FOR COLOR CRT

Reference to related application, assigned to the assignee of the present invention, the disclosure of which is hereby incorporated by reference: U.S. Ser. No. 008,310, filed Jan. 29, 1987, SCHILLER DE PS 33 37 298 to which correspond U.S. applications, priority of Oct. 14, 1983, No. 434,314, now U.S. Pat. No. 4,484,228, PARKER/RCA, Ser. No. 434,329.

The present invention relates to video amplifier circuits, and more particularly to a circuit to control the working or operating point of wide-band video output amplifiers.

BACKGROUND

Color television apparatus utilizes circuits to control the working point of video power amplifier stages. A voltage, representative of beam current of the electron beam of the cathode ray tube of the television set is compared with a reference or comparison voltage during the vertical scanning interval just after the vertical retrace. The result of the comparison is stored during the subsequent field, corresponding to a half-frame. Depending on the stored voltage, the working point of the video end or power or output stage is controlled.

Circuits of this type, which are known as sticking voltage control circuits, or set point controls, or cut-off automatic circuits, are combined with other circuits, for example video amplifiers, in a single integrated network. Such integrated circuits (ICs) or integrated networks have video amplifiers of comparatively narrow band width; they are thus not suitable for high resolution data display apparatus, high-resolution monitors, and the like.

THE INVENTION

It is an object to permit utilization of available integrated circuits while meeting the requirements of high resolution output displays.

Briefly, the output signal of the sticking voltage circuit or set point circuit is superimposed over the video signal applied to the video output stage. When the monitor is a color monitor, three video end or output stages and three sticking voltage or set point or cut-off automatic circuits are used.

The arrangement permits utilization of existing integrated circuits which are comparatively inexpensive, while still providing appropriate control of the operating point of the amplifiers for high resolution output display elements.

DRAWING

The single FIGURE is a schematic block circuit diagram of the circuit arrangement in accordance with the present invention, in which conventional components are illustrated only generally and in block form.

DETAILED DESCRIPTION

Three input terminals 1, 2, 3 receiving, for example, red (R), green (G) and blue (B) video chroma signals, are applied to respective video amplifiers 4, 5, 6, of which only the amplifier 6 is shown in detail. Amplifiers 4, 5 are identical to amplifier 6. The outputs of the respective amplifiers 4, 5, 6 are connected, each, to a respective cathode 7, 8, 9 of a color cathode ray tube (CCRT) 10.

Input 3 receives the blue chromaticity signal which is applied to a video preamplifier 11. The amplification factor is controllable, as schematically indicated by the arrow withiin block 11, to control contrast. The output of the video preamplifier 11 is coupled over capacitor 12 with the base of an emitter-follower transistor 13. Emitter-follower transistor 13 is connected to a clamping circuit 14. Clamping circuit 14 connects the base of transistor 13 with a fixed voltage during the vertical retrace, so that the video signal will receive, as well known, a constant d-c value. The clamping circuit 14 is similarly connected to the video amplifiers 4 and 5, as indicated by the arrows leading to the units R, G.

The emitter of transistor 13 is coupled via emitter-resistor 15 to ground or reference potential, the collector of transistor 13 being connected to a source 16 of positive operating voltage. A coupling resistor 17 couples the chromaticity signal to the input of an inverting amplifier 18. The inverting amplifier 18 has an idle or free-running amplification which is so high that the effective amplification corresponds at least roughly to the ratio between the feedback resistor 19 and the coupling resistor 17. The output of amplifier 18 will be sufficient so that the video signals thereat will have an amplitude suitable for controlling the cathode ray tube 10. They are coupled via an output transistor 20 to the cathode 9 of the CCRT 10.

The collector of transistor 20 is connected via a collector resistor 21 to ground, chassis or reference potential. A control voltage is available across the collector-resistor 21 which is proportional to the beam current from the cathode 9. This beam current is applied to a video processor 22 which is an integrated circuit, known as such, to control the operating point of the video amplifiers 18, 20. Video processors in integrated circuit form, such as the video processor 22, are commercially available, for example under the Type TDA 3301.

The video processors, as well as the cut-off automatic control circuits therein, are known as such, and therefore the description herein can be brief. Only those circuit components necessary for an understanding of the present invention will be described, which form only a fraction of the circuits within the video processor.

The voltage across the collector-resistor 21 of the output transistor 20 is applied to an input 23 of a difference amplifier 24. A reference voltage is applied to terminal 25, forming the second input to amplifier 24.

The difference amplifier 24 is a switchable operational amplifier, at the output terminal 26 of which a signal appears only when a switching enabling input EN has a signal thereon. At all other times, the output 26 is at high resistance level. The switching or enabling input EN will receive a strobing pulse which corresponds to an active line within the vertical frequency scanning interval, e.g. just after vertical retrace. During this time, then, the result of the formation of the difference between beam current and reference current is available from the difference amplifier 24. This result is applied as a voltage to a capacitor 27, which is charged to a respective value. Together, the difference amplifier 24 with the enabling input EN, and the capacitor 27, form a sample-and-hold circuit.

The voltage across capacitor 27 is applied to the base of a transistor 28 which, together with the resistor 29, is connected as an impedance matching or conversion circuit. The base of the transistor 28 forms a high resistance input, so that the charge of the capacitor 27 remains effectively constant during any feed or half-frame of a video image.

The cut-off automatic is present in triplicate, once for each of the chromaticity signals R, G, B. Besides the input 31 for the beam current of cathode 9, suitable input terminals 32, 33 are available for the channels R and G. In accordance with a feature of the invention, control voltages are available across the emitter-resistor 29 of the transistor 28, and connected via terminal 34 and a controllable coupling resistor 37 to the input of the inverting amplifier 18 of the video amplifier 6. By changing the resistance of resistor 37, the amplification of the control loop formed by the video processor 22 and the video amplifier 18, 20 can be controlled without changing the amplification of the video signal supplied from the preamplifier 11 and the transistor 13.

Corresponding outputs 35, 36 are available in the video processor 22, from circuits identical to the components 24-27-28-29 just described and coupled, respectively, to the cathodes 7, 8 of the CCRT 10. The outputs from terminals 35, 36 are connected to suitable inputs of inverting amplifiers in the respective amplifiers 4 and 5.

The video processor, further, includes a circuit to control the brightness as well as for flyback or retrace scanning, which could be utilized for the circuit arrangement in accordance with the present invention. Thus, to control brightness, the video processor 22 receives a controllable voltage from a potentiometer 38, corresponding to or defined as brightness control voltage. The brightness control voltage can be positive as well as negative, and is utilized in the video processor 22 by being added to the output voltages of the sticking voltage or set point voltage or cut-off automatic voltage supplied thereby. No addition of the brightness voltage will occur during line retrace and during measurement of the beam current described above.

The color temperature may be falsified upon change in brightness, as a consequence of different slope in the respective color portions of the CCRT 10 and the respective characteristic relationships with respect to the colors. To prevent such distortion, resistor 37 is controllable to control the output signal or, rather, the extent of superimposition of a signal from the video processor 22 on the amplifier 6. The brightness of the three colors, thus, can be changed over a control input of the video processor 22 by means of a direct current voltage. This can be done manually or automatically by control from a computer coupled to a display or monitor unit. Sandcastle pulses are applied to the terminals 39, 40 of the video processors 22 to provide for control with respect to time thereof and, further, to provide vertical frequency scanning or blanking pulses so that proper timing relationship can be maintained.

We claim:

1. In a color video output circuit having a video processor (22) and, for each of a respective red, green, and blue chromaticity signal, a respective output amplifier (18, 20), and a respective sticking-voltage control circuit (23-29) in said video processor (22),
    a circuit arrangement to control the respective working points of said output amplifiers (18, 20) to, in turn, control cathode beam currents (7, 8, 9) of a cathode ray tube (10) having color video signals (1, 2, 3; R, G, B) applied thereto,
    comprising
    means (21) for couping a voltage (31, 32, 33) corresponding to the respective cathode beam current to the video processor (22) to form an input voltage thereto; and
    connection means (34, 35, 36) for superimposing an output signal from the video processor (22) on the video signal being applied to the respective output amplifier (18, 20), said connection means including a controllable resistor (37) connected between the video processor (22) and the respective output amplifier (18,20).

2. The circuit arrangement of claim 1, wherein the sticking voltage, set point or cut-off automatic control circuit comprises a sample-and-hold circuit (24, EN, 27) scanning deviation of beam current from a reference value during a scanning interval at vertical deflection frequency and occurring after beam retrace or flyback.

3. The circuit arrangement of claim 2, wherein the output amplifier is a side-band amplifier.

4. The circuit arrangement of claim 1, further comprising a controllable voltage source (38) coupled to the video processor and providing a direct voltage to control brightness of the image displayed on the cathode ray tube (10).

5. The circuit arrangement of claim 4, wherein the output amplifier is a wide-band amplifier.

6. the circuit arrangement of claim 1, wherein the output amplifier is a wide-band amplifier.

* * * * *